United States Patent Office 3,005,847
Patented Oct. 24, 1961

3,005,847
AMINE SULFONATES
Ulric B. Bray, Pasadena, Calif., assignor to Bray Oil Company, Los Angeles, Calif., a limited partnership of California
No Drawing. Filed Apr. 17, 1956, Ser. No. 578,593
10 Claims. (Cl. 260—501)

This invention relates to amine sulfonates and their preparation. It relates particularly to compounds of amines in combination with sulfonic acids of the preferentially oil soluble type commonly known as "mahogany acids." Still more particularly it relates to solutions in lubricating oils of salts of amines with purified mahogany acids, substantially free of green sulfonic acids and salts of metals, such as sodium, calcium, etc. which are detrimental to the use of the product.

One object of the invention is to prepare amine salts of mahogany acids having a high degree of purity and freedom from green acid soaps and metallic salts which exert a corrosive effect on metals when the mahogany amine salts are used in antirust compounds, motor fuel additives, lubricating oil additives, etc. Another object of the invention is to prepare amine salts of sulfonic acids entirely free from sulfates. Still another object of the invention is to prepare basic amine mahogany sulfonates particularly valuable in preventing corrosion when compounded with gasoline, diesel fuel, lubricating oils, furnace oils and the like.

Heretofore it has been the practice, when preparing amine sulfonates, to neutralize the free sulfonic acid with the chosen amine, generally in the presence of oil and water, then dehydrate the mixture and clarify by filtration, providing an oil solution of the amine sulfonate. The free sulfonic acid was usually prepared by sulfonating a pertoleum lubricating oil or an alkylated benzene, or it could be prepared by decomposing a crude sulfonate of sodium with strong acid such as hydrochloric or sulfuric acid. When prepared in this way, it is impossible to eliminate from the amine sulfonate all the contaminating salts, such as sodium chloride, sodium sulfate and sodium sulfite. In the case of the metal sulfonates such as sodium, calcium and barium sulfonates, it has long been recognized that the presence of sulfates and sulfites is very objectionable from the standpoint of corrosion when used in antirust and corrosion protective compositions, oil and greases. In the case of the amine sulfonates, the harmful effects of amine sulfates and sulfites are even more aggravated, owing to the tendency of these compounds to hydrolyse to free acids.

I have now discovered that amine sulfonates can be prepared substantially free of sulfates and sulfites by first preparing the purified calcium, strontium or barium sulfonates, then converting in the presence of a polar solvent to an amine sulfonate by the simultaneous action of an amine and carbon dioxide. In practice, I prepare an oil solution of the calcium or barium sulfonate, add water and the desired amine, then pass in carbon dioxide, preferably under pressure and with agitation. In addition to the water it is desirable to have a suitable emulsion breaking liquid present, either during the injection of the carbon dioxide or afterward. I can also introduce the carbon dioxide into the amine before adding to the oil, then continue addition of carbon dioxide to the oil-amine carbonate mixture. Pressures from atmospheric to 100 p.s.i. are advantageous. The polar solvent used as emulsion breaker in the conversion is suitably an alcohol, ether-alcohol, ketone or similar solvent which is soluble in both water and oil. Alcohols of 4 to 6 carbon atoms such as butyl and amyl alcohols are particularly effective. It is desirable that they be sufficiently volatile to be readily removed from the amine sulfonate product by distillation, in vacuum if desired. Following are some of the polar solvents found suitable: Acetone, methyl ethyl ketone, isopropyl alcohol, isopropyl acetate, ethyl hydroxy ethyl ether, ethyl acetate, methoxy ethyl acetate and ethoxy ethyl acetate (Cellosolve acetate); dioxane; methoxy ethyl alcohol and ethoxy ethyl alcohol (Cellosolve); diacetone alcohol and mesityl oxide.

The calcium or barium present in the sulfonate separates as a fine white colloidal precipitate which can be settled from the oil-sulfonate-solvent mixture as a slurry which will compact into a leathery deposit on the bottom. Settling is facilitated by heat, a temperature of about 140–160° F. being suitable. The clear oil is removed from the precipitate and dehydrated to remove solvent and water, then filtered to give the clear product of amine sulfonate dissolved in oil. Heating to a temperature of 250° F. to 350° F. or higher when necessary. When the amine sulfonate is sensitive to heat, dehydration in a vacuum can be resorted to. Excess amine in the product has a stabilizing action.

A wide variety of amines can be used to make the amine sulfonates. Thus I may use the aliphatic amines, primary, secondary or tertiary, such as ethyl, isopropyl, butyl and amyl amines. Dibutyl and tributyl amine sulfonates are excellent lubricating oil additives. More basic amines such as the heterocyclic morpholine give sulfonates which are neutral or slightly basic when an excess of the amine over the stoichiometrical amount is present. Polyamines such as the diamines and triamines are useful for preparing sulfonates of a basic character, suitable for neutralizing corrosive acids which may be encountered in machine lubrication. Ethylene diamine and propylene diamine are examples of the former while diethylene triamine is an example of the latter. Triethylene tetramine is an example of a still more highly aminated compound which I can use in my process of making amine sulfonates. The alkylol amines such as the mono, di and tri ethanol and propanol amines are quite valuable for making oil-in-water emulsions. Because of the relatively low volatility of these amines, particularly triethanol amine, an excess of the amine can be incorporated in the amine sulfonate above the stoichiometric amount, thus providing a basic product stable at elevated temperature.

When employing the polyamine compounds, I can combine them with sulfonate in the ratio of mol for mol producing a basic amine sulfonate or I can combine them in the ratio of one equivalent of sulfonate for an equivalent of amine, producing a neutral sulfonate. Because of the instability of the sulfonic acids to heat, I prefer to make the basic sulfonates.

Aromatic amine such as aniline, mono and di-methyl aniline, phenylene diamine, mono butyl and N,N-dibutyl phenylene diamine can be employed, preferably in a ratio of one mol per mol of sulfonate. Heterocyclic amines such as pyridine, pyrrolidine, pyrrole and their alkyl derivatives are also suitable for making neutral or basic amine sulfonates. Amino phenols can also be used as well as the amino phenyl ethers. They confer on the finished product a resistance to oxidation by virtue of the antioxidant properties of the amino phenols and the phenylene diamines, particularly the ortho and para phenylene diamines.

The following examples will serve to illustrate my process:

EXAMPLE 1

A purified calcium sulfonate was made by the method shown in my U.S. Patents Nos. 2,453,690 and 2,689,221 whereby a lubricating oil, average molecular weight about 400, was sulfonated with oleum, separated from sludge, neutralized with sodium hydroxide, purified by extraction with butyl alcohol and sodium chloride brine, concentrated and converted to calcium sulfonate with a calcium chloride solution. Some excess lime was added during dehydration to 300° F., and the oil was filtered to clarify it. Analysis follows:

Ash-sulfated_____ 5.98%.
Alkali value—ASTM _____ 3.9.
Conversion_____ 93.6% calcium equivalent.

To 200 parts by weight of this oil-sulfonate product was added 30 parts triethanol amine and 200 parts of sec. butyl alcohol saturated with water (28% water). Carbon dioxide ($CO_2$) was bubbled into the mixture at room temperature for 2 hours. A mushy precipitate of calcium carbonate ($CaCO_3$) formed. This was filtered from the mixture and the filtrate was evaporated until the temperature reached 300° F., When titrated with phenolphthalein indicator, it had an acid value of 30 ASTM. With methyl orange indicator, however, the product had an alkali value of 34. Additional tests gave the following results:

Dilution in petroleum thinner_____ Clear.
Ash-sulfated 0.355%_____ (Mostly $Na_2SO_4$).

EXAMPLE 2

To 400 grams of the same lot of calcium sulfonate used in Example 1 was added 300 cc. aqueous sec. butyl alcohol, 25 cc. morpholine and 75 cc. water. Carbon dioxide ($CO_2$) was bubbled through the warm mixture for about 3 hours. Then the mixture was diluted with 200 cc. of light petroleum naphtha and filtered with pressure to remove precipitated calcium carbonate, using as a filter aid, a diatomaceous earth known comercially as "Hy-Flo." The clear filtrate was dehydrated by heating to 300° F., a small amount of excess morpholine being driven off at this temperature. The hot oil was refiltered to clarify it and the following analyses and tests were made with it:

Ash (sulfated)_____percent__ 0.387
Alkali Value—Methyl orange indicator___do____ 0.5
Sulfonate content_____do____ 40
Molecular weight (by titration)_____ 525

The ash was dissolved in water and shown to be mostly sodium sulfate which apparently was derived from unconverted sodium sulfonate present in the calcium sulfonate, and not changed to morpholine sulfonate by the $CO_2$ treatment. Analysis of the original calcium sulfonate indicated 93.6% calcium sulfonate.

The white, leathery, cake from the filtration in naphtha was washed with ether and dried to a fine powder which effervesced in dilute hydrochloric acid giving a solution which tested positive for calcium, showing it to be calcium carbonate.

*Corrosion test*

The morpholine sulfonate prepared above was dissolved in 150 neutral oil in four concentrations—1, 2, 4 and 6%. The resulting oil compositions were tested for corrosion prevention in the hydrobromic acid test (USA-2-126) and the himidity cabinet test (MIL-L-644A) with the following results:

|  | 1% | 2% | 4% | 6% |
|---|---|---|---|---|
| Hydrobromic Acid | Passes | Passes | Passes | Passes. |
| Humidity—168 hrs | 2 rust spots, 2 mm. diam. | ___do___ | ___do___ | Do. |

These results show that morpholine mahogany sulfonate prepared by conversion of the alkaline earth metal sulfonate, is an excellent corrosion preventive for mineral lubricating oil.

EXAMPLE 3

To 300 grams of purified calcium sulfonate prepared by conversion of sodium sulfonate as hereinabove described, was added 300 cc. water and 20 gm. ethylene diamine (85%) equal to one mol per mol of sulfonate. The calcium sulfonate gave the following inspection:

Ash (sulfated)_____percent__ 8.64
Alkali Value (ASTM)_____ 19.0
Neutral ash (calculated)_____percent__ 6.3
Mol wt_____ 480

Into the mixture of sulfonate, water and ethylene diamine was passed a stream of $CO_2$ with agitation of the creamy emulsion. Then 100 cc. of aqueous sec. butyl alcohol was added to break the emulsion. $CO_2$ was continued for one hour and the mixture was heated to the boiling point. To the mixture was then added 100 cc. more water and 100 cc. more sec. butyl alcohol and the mixture was allowed to settle at 150° F. The next day, the mixture had separated into a clear oil solution and a layer of white emulsion of calcium carbonate at the bottom. The latter was drawn off as a thick fluid emulsion, and washed with a light solvent naphtha to recover sulfonate contained on the precipitate. The washings and clear oil layer were combined and further treated with $CO_2$ to insure complete conversion of calcium, no further precipitate appearing.

The oil-sulfonate solution was heated to 300° F., to drive off water and solvent, (1 hr.) then filtered hot with "Hy-Flo" filter aid. The product was a clear, red-brown oil, viscous when cold.

Yield _____grams__ 302
Ash-(sulfated) _____percent__ 0.549
Alkali value (methyl orange)_____ 41.0

The water extract of the ash showed it to be mostly sodium sulfate with a trace of iron and no detectable calcium, showing complete conversion of the calcium sulfonate to amine sulfonate.

Emulsification tests on the product showed it to be insoluble in cold water. Boiling in hot water with agitation, however, gave a water-in-oil emulsion which, on further dilution with hot water, reversed to an oil-in-water emulsion.

As starting materials I usually employ lubricating oils or benzene alkylates having molecular weights in the range of about 300 to 500, generally 350–425: in preparing my sulfonates, it should be understood that I may use other sulfonating agents besides oleum. Thus I can use $SO_3$, commonly known as "Sulfan" or I can use chlor sulfonic acid, well known in the art of sulfonation. The sulfonic acid, after removal of sludge, can be neutralized with lime or barium oxide directly without proceeding through the steps of sodium hydroxide neutralization and conversion to calcium or barium soap. The large amounts of insoluble barium or calcium sulfates and sulfites formed by direct neutralization of unpurified sulfonate make the product difficult to filter but it can be settled out, preferably at the time of removing the calcium carbonate during the later conversion with $CO_2$. When direct formation of alkaline earth metal sulfonate is employed, the product should be thoroughly washed with water and an emulsion breaking solvent to remove soluble salts and preferentially water soluble sulfonates of these metals, before conversion to amine sulfonate with $CO_2$. Any basic salt of alkaline earth metal can be used to neutralize the sulfonation mixture of oil, sulfonic acid and sulfuric acid. Examples are lime, barium oxide, barium carbonate, limestone, strontium hydroxide, barium hydroxide and calcium hydroxide.

The calcium sulfonate employed in the $CO_2$-amine conversion reaction can possess a substantial amount of free metal hydroxide equivalent to about 5 to 50 mg. KOH per gram of sulfonate-oil free basis. This free base has the effect of rendering the sulfonate more fluid. Treatment with $CO_2$ converts the free base to carbonate with no disadvantage other than loss of $CO_2$. The sulfonates in this invention are generally of 420 to 575 mol. wt., preferenctially water insoluble, magohany type. Calcium or barium carbonate formed by the action of $CO_2$ and amine can be centrifuged from the reaction mixture, either intermittently or continuously. The resulting cake can be washed with solvent, such as benzene, to recover oil and sulfonate. Alcohol, such as ethyl, isopropyl or butyl, can be added to the benzene to prevent emulsions.

The amine mahogany sulfonates are particularly valuable for uses where an ash-free surface active agent is desirable as in gasoline and other fuels. When used in plant sprays, they leave no detrimental alkali metal residue on the foliage to attack the plant. In internal combustion engine fuels and lubricants, they do not contribute to refractory deposits on cylinders, pistons, valves and spark plugs. A suitable gasoline additive may contain about 2% to 10% of the amine sulfonate, e.g.: ethylene diamine sulfonate, in a light lubricating oil such as 100 viscosity (SSU at 100° F.) pale oil. This composition can be added to the gasoline in the proportion of 0.1 to 0.5 oz. per gal. of gasoline.

In my process of making the amine sulfonates by conversion of alkaline earth metal sulfonates, I have provided a product which is completely free of sulfates, owing to the precipitating action of these metals on sulfates. This is particularly the case with barium sulfonate owing to the high insolubility of barium sulfate. It has long been a serious problem to make sulfonates free of sulfates, owing to the fact that the sulfates form a complex association compound with the sulfonates.

Having thus described my invention, what I claim is:

1. The process of making amine sulfonates of mahogany acids substantially free of sulfates which comprises sulfonating a hydrocarbon lubricating oil and converting the resulting preferentially oil soluble sulfonic acids to an alkaline earth metal sulfonate, converting said alkaline earth metal sulfonate to an amine sulfonate by the simultaneous action of carbon dioxide, water and an amine on a solution of said alkaline earth metal sulfonate thereby converting the alkaline earth metal content of said sulfonate to carbonate, separating insoluble alkaline earth metal carbonate from the reaction mixture and recovering the amine sulfonate from the solution.

2. The process of claim 1 wherein the said amine is a polyamine and the ratio of amine to sulfonate exceeds the stoichiometric amount.

3. The process of claim 2 wherein the said polyamine is ethylene diamine.

4. The process of making an amine mahogany sulfonate substantially free of sulfates which comprises sulfonating a hydrocarbon lubricating oil and neutralizing the resulting preferentially oil soluble sulfonic acids with caustic soda, washing the resulting sodium mahogany sulfonate to remove sulfates by washing with water and an emulsion breaking liquid and then converting to an alkaline earth metal sulfonate by metathesis with a chloride of said alkaline earth metal and again washing with water to remove water soluble salts, converting said alkaline earth metal sulfonate to the desired amine sulfonate by contacting it simultaneously with an amine and carbon dioxide in the presence of water and an emulsion breaking solvent, thereby forming a precipitate of an insoluble alkaline earth metal carbonate, and finally recovering the amine sulfonate from the reaction mixture.

5. The process of claim 4 wherein said emulsion breaking liquid is an alcohol having from 1 to 6 carbon atoms.

6. The process of claim 4 wherein said amine is a polyamine selected from the class consisting of ethylene diamine, propylene diamine, diethylene triamine, triethylene tetramine and phenylene diamine, and the ratio of said amine to sulfonate in said carbon dioxide conversion reaction exceeds the stoichiometric ratio, thereby producing an amine sulfonate product which is basic to methyl orange indicator.

7. The process of making amine sulfonates of mahogany sulfonic acids which comprises sulfonating a hydrocarbon lubricating oil to produce an oil solution of the said sulfonic acid contaminated with sulfuric acid, neutralizing the said solution with a basic salt of an alkaline earth metal and washing with water in the presence of an emulsion breaking liquid to remove water soluble salts, converting the alkaline earth metal sulfonates to amine sulfonates and insoluble alkaline earth metal carbonates by the simultaneous action of an amine and carbon dioxide in the presence of water and an emulsion breaking solvent, then separating the oil and dissolved amine sulfonate from the insoluble alkaline earth metal carbonate and sulfate.

8. The process of claim 7 wherein said emulsion breaking solvent is butyl alcohol.

9. The process of claim 7 wherein said emulsion breaking solvent is dioxane.

10. The process of making ethylene diamine sulfonate from preferentially oil soluble sulfonic acids which comprises forming the calcium salt of the acid in solution in lubricating oil, adding an aqueous solution of ethylene diamine in the amount of one mol per mol of sulfonate, injecting carbon dioxide into the mixture, thereby forming a creamy emulsion of insoluble calcium carbonate in oil and water, adding sec. butyl alcohol in amount sufficient to break the emulsion, continuing the injection of carbon dioxide while heating the mixture, settling the mixture to form a clear oil layer and a precipitated emulsion of calcium carbonate, separating the oil layer and dehydrating it by heating, then filtering the oil to give the diamine sulfonate product as a clear, red-brown oil, viscous when cold.

References Cited in the file of this patent

UNITED STATES PATENTS

| | | |
|---|---|---|
| 2,307,953 | Potter | Jan. 12, 1943 |
| 2,324,199 | Datin | July 13, 1943 |
| 2,355,310 | Liberthson | Aug. 8, 1944 |
| 2,375,899 | De Groote | May 15, 1945 |
| 2,533,300 | Watkins | Dec. 12, 1950 |
| 2,689,221 | Bray | Sept. 14, 1954 |
| 2,702,819 | Axe et al. | Feb. 22, 1955 |